United States Patent [19]
Vollmer

[11] Patent Number: 5,050,684
[45] Date of Patent: Sep. 24, 1991

[54] COUPLING HOOK

[75] Inventor: Jürgen Vollmer, Lohmar, Fed. Rep. of Germany

[73] Assignee: Jean Walterscheid GmbH, Fed. Rep. of Germany

[21] Appl. No.: 505,245

[22] Filed: Apr. 4, 1990

[30] Foreign Application Priority Data

Apr. 15, 1989 [DE] Fed. Rep. of Germany ....... 3912414

[51] Int. Cl.$^5$ .................. A01B 51/00; A01B 59/043
[52] U.S. Cl. .................................. 172/272; 414/703; 280/508; 172/439
[58] Field of Search .............. 172/272, 273, 274, 275; 37/231, DIG. 12; 403/327, 330, 325, 317; 414/728, 686, 703, 920; 280/507, 504, 510, 460.1, 508

[56] References Cited

U.S. PATENT DOCUMENTS

| | | | |
|---|---|---|---|
| 3,807,769 | 4/1974 | Thompson et al. | 172/272 |
| 3,977,698 | 8/1976 | von Allworden | 172/272 |
| 4,014,562 | 3/1977 | Kunze | 280/508 |
| 4,071,263 | 1/1978 | Kunze | 280/508 |
| 4,366,967 | 1/1983 | Vollmer et al. | 172/272 |

FOREIGN PATENT DOCUMENTS

| | | | |
|---|---|---|---|
| 2535934 | 5/1984 | France | 172/272 |
| 97410 | 4/1988 | Japan | 280/504 |
| 1533862 | 11/1978 | United Kingdom | 172/272 |
| 2192122 | 1/1988 | United Kingdom | |

Primary Examiner—Peter M. Cuomo
Assistant Examiner—Spencer Warnick
Attorney, Agent, or Firm—Toren, McGeady & Associates

[57] ABSTRACT

A coupling hook (5) comprises a housing (7, 8) defining a recess (10) in which a bearing ball (12) of an implement pin (41) is received. The hook also comprises a spring-loaded locking catch (14). The catch (14) is pivotal about a bearing pin (19) with play in the direction of a first line (18) connecting the center (13) of the recess (10) to a contact point (15) between the locking catch (14) and a ball (12) in the recess (10). The coupling hook (5) also comprises a locking stop (23) engaging the locking catch (14) in an undercut recess (25) thereof to define the locking position. The size of the undercut is less than or equal to the size of the play of the catch (14) on the bearing pin (19).

13 Claims, 4 Drawing Sheets

COUPLING HOOK

BACKGROUND TO THE INVENTION

1. Field of the Invention

This invention is concerned with a coupling hook suitable for use on a lower steering arm of a three-point attaching device of a tractor for receiving and locking an implement pin or a bearing ball, such bearing balls being commonly mounted on such implement pins.

Such coupling hooks commonly comprise a housing defining a recess in which a pin or ball may be received, and a spring-loaded locking catch movable into a locking position thereof in which the catch has a contact point with a pin or ball in the recess to retain it in the recess. The locking catch is normally pivotal about a bearing pin supported by the housing into an unlocking position against the force of a spring so that pins or balls can be removed from or placed in the recess.

2. Description of Prior Art

Such a coupling hook is known from GB Patent Specification No. 1 533 862. In this construction, actuation levers are provided having pivot points arranged in particular positions with the objective of preventing the locking catch from moving into its unlocking position unintentionally when relative movement occurs between the implement pin or ball and the coupling hook. One of the actuation levers is provided with an arm which enables the implement pin or ball itself to move the catch into its unlocking position so that the pin or ball can enter the recess.

The disadvantage of this known design is that it is necessary to provide several actuation levers and that the retaining forces required for retaining the implement pin or ball in the recess in the locked position of the locking catch directly act on the pivot points of the actuation levers. When the implement pin or ball presses against the locking catch, the forces have to be accommodated directly by the pivot points.

SUMMARY OF THE INVENTION

It is an object of the present invention to provide a coupling hook which has a locking mechanism of simple design which secures the locking catch against unintentional opening in the locking position and in which the pivot points are unaffected by the retaining forces to be accommodated when the implement pin or bearing ball press against the locking catch.

The invention provides a coupling hook suitable for use on a lower steering arm of a three-point attaching device of a tractor for receiving and locking an implement pin or a bearing ball mounted on an implement pin, the coupling hook comprising a housing defining a recess in which a pin or ball may be received, and a spring-loaded locking catch movable into a locking position thereof in which the catch has a contact point with a pin or ball in the recess to retain it in the recess, the catch being pivotal about a bearing pin supported by the housing into an unlocking position thereof against the force of a spring, wherein the coupling hook also comprises a locking stop for the catch supported by the housing and defining the locking position of the locking catch by engagement therewith, and wherein the bearing pin supports the locking catch with play in the direction of the line from said contact point to the centre of the recess defined by the housing or parallel thereto and the locking stop engages the catch in a recess of the catch, the recess of the catch having an undercut from its entrance, the size of the undercut being less than or equal to the size of the play with which the bearing pin supports the catch.

The advantage of this design is that, in the locked position, the locking catch is directly supported on the locking stop if the implement pin or bearing ball exerts a force on the locking catch in the direction of the locking stop, with no retaining forces being transmitted to the pivot point of the locking catch. The undercut provides a great deal of security in preventing the locking catch from escaping from its locking position. The play permits the locking catch to move safely into its unlocking position and out of its unlocking position into the locking position.

Preferably, the locking stop has its axis arranged so that a first line from said contact point to the centre of the recess defined by the housing and a second line from said axis to said contact point enclose an angle of between 140 degrees and 200 degrees measured outwardly away from the recess. If the angle is substantially 180 degrees good results are obtained. The angle may also be between 140 and 180 degrees or between 180 degrees and 200 degrees.

In a preferred embodiment, the axis of the bearing pin is arranged on an extension of the line from said contact point to the centre of the recess defined by the housing.

Conveniently, the bearing pin passes through an oblong hole in the locking catch providing the play, the longitudinal axis of the hole, when the catch is in the locking position, extending in the direction of the line from said contact point to the centre of the recess defined by the housing or parallel thereto. The position of the oblong hole ensures that the locking catch moves safely into the locking position and that the catch is safely held relative to the locking stop.

The locking stop is preferably in the form of a pin whose centre is on an extension of the line from said contact point to the centre of the recess defined by the housing. In this case, the recess is adapted to the contour of the pin.

In a further embodiment, the coupling hook also comprises a tie rod pivotally fixed to the locking catch eccentrically relative to the bearing pin thereof, the tie rod projecting out of the housing of the coupling hook, and the spring which loads the locking catch into its locking position being arranged concentrically of the tie rod and acting between the locking catch and an inner face of the housing. The locking catch is moved into the locking position with the spring force and play being sufficient to move the locking catch beyond the undercut so that the locking stop, when loaded by a bearing ball or an implement pin, may engage the recess in the locking catch.

Conveniently, the tie rod is received between two fork arms of the locking catch which support a pivot pin of the tie rod. Thus, the locking catch is provided with a recess in which the tie rod is received.

The tie rod may define a locking recess which may be engaged with a stop face of the housing to hold the locking catch in the unlocking position thereof.

A portion of the housing which accommodates the locking catch is conveniently made of sheet metal or cast steel non-removably, for example by welding, attached to a portion of the housing which defines the recess. By choosing this design it is possible to produce the elements which provide the locking functions as a pre-assembled unit which is subsequently connected to the recess-defining portion.

Preferably, the coupling hook also comprises a limiting stop arranged to limit the movement of the locking catch in the direction of its unlocking position.

BRIEF DESCRIPTION OF THE DRAWINGS

A preferred embodiment of the invention is shown diagrammatically in the drawings, by way of example.

In the drawings.

DESCRIPTION OF PREFERRED EMBODIMENTS

Figure 1:
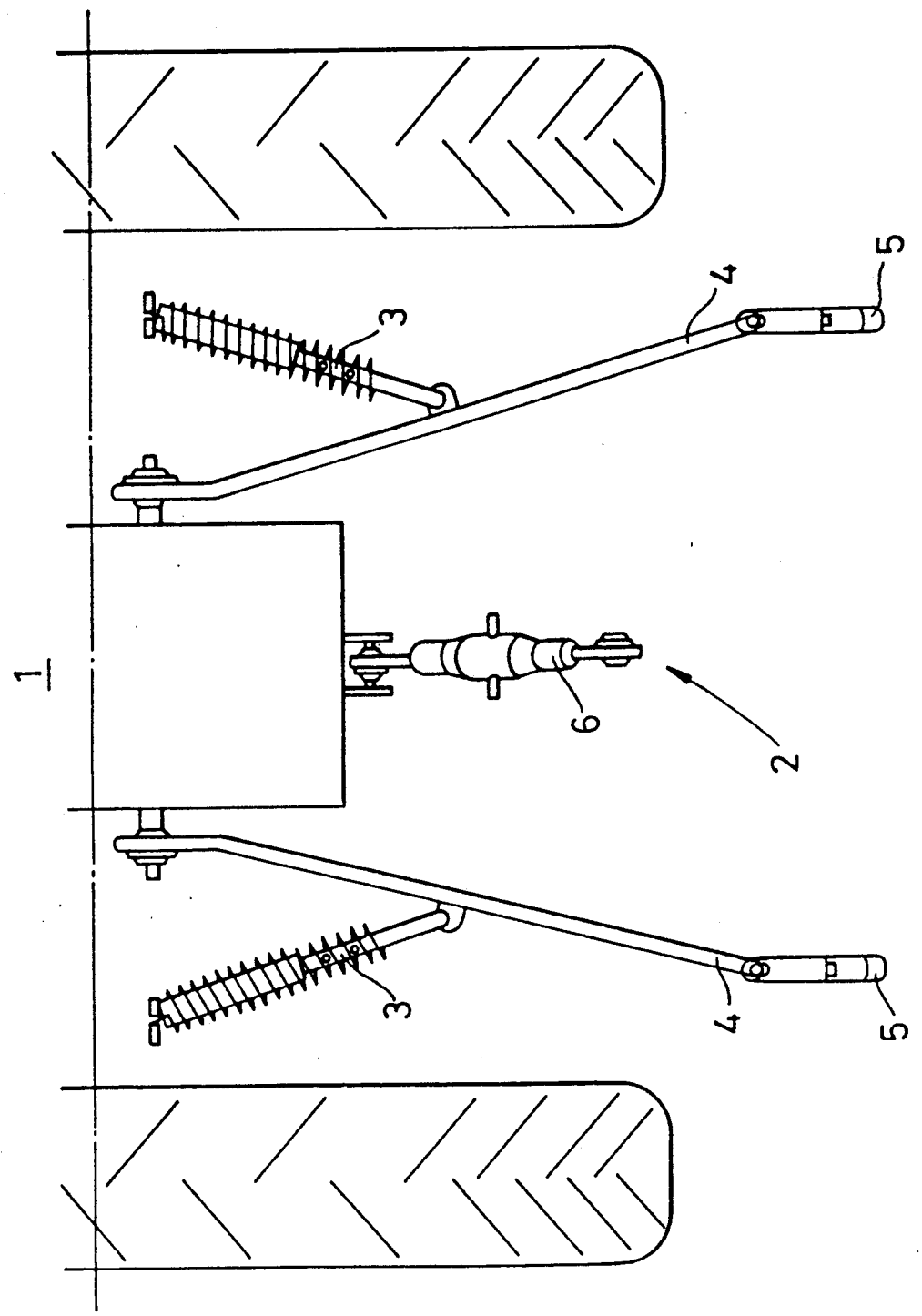
FIG. 1 is a partial plan view of a rear portion of a tractor showing the attachment of a coupling hook to each of the lower steering arms thereof.

FIG. 1 shows a plan view of part of the rear end of a tractor 1 at whose lower end two lower steering arms 4 have been connected so that they are pivotally mounted. At their sides, the two lower steering arms 4 are resiliently supported by lateral stabilisers 3. At their free ends, the lower steering arms 4 each carry a coupling hook 5. Above the two lower steering arms 4, centrally between them, an upper steering arm 6 has been fixed to the tractor. The lower steering arms 4 and the upper steering arm 6 together form a three-point attaching device 2 for attaching implements to the tractor. The implements are provided with corresponding implement pins which may have bearing balls supported on them.

The two coupling hooks 5 are of identical construction so that only one will be described hereinafter. Each coupling hook 5, thus, is suitable for use on the lower steering arm 4 of a three-point attaching device 2 of a tractor 1 for receiving and locking an implement pin 41 or a bearing ball 12 mounted on the implement pin 41.

The coupling hook 5 comprises a housing consisting of a hook jaw portion 7 and a locking mechanism supporting portion 8. The portion 8 which accommodates a locking catch 14 is made of sheet metal and is non-removably attached to the portion 7 by a weld 9. The hook jaw portion 7 defines a recess 10 of a hook jaw 11 in which the implement pin 41 or the ball 12 may be received and locked by the locking catch 14. The bearing ball 12 has a spherical outer surface 17 which the recess 10 is designed to match. The centre of the recess 10 has been given the reference numeral 13.

Figure 2:
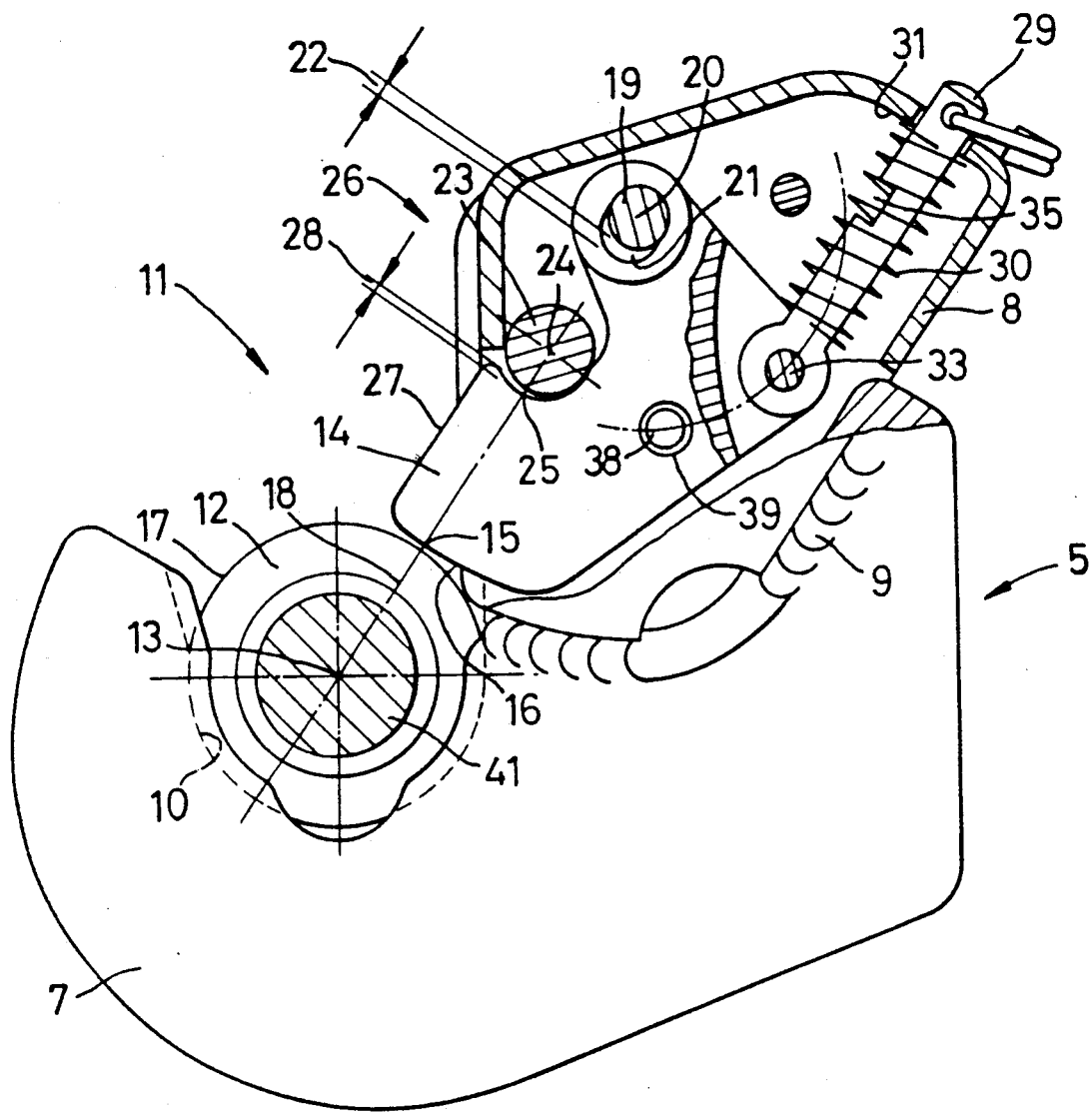
FIG. 2 shows the coupling hook, partially in section, with a locking catch thereof in a locking position.
Figure 3:
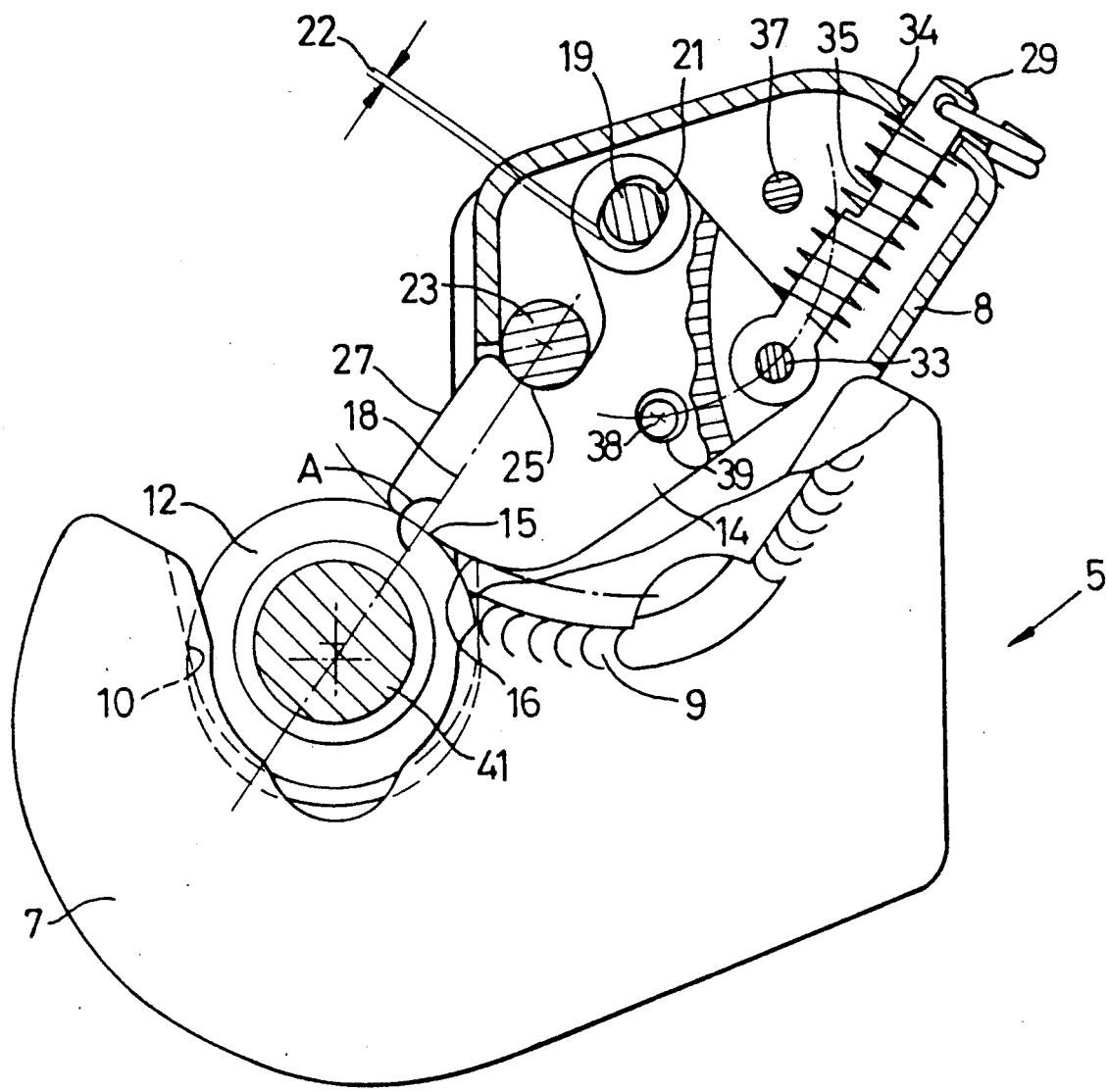
FIG. 3 is a view similar to FIG. 2 with the locking catch also in the locking position, showing the effect of a force applied to the locking catch by a bearing ball of an implement pin.

The locking catch 14, shown in FIG. 2 in its locking position, is spring-loaded and is movable into its locking position in which the catch 14 has a contact point 15 on a locking face 16 thereof with a pin or ball in the recess 10 to retain it in the recess. The locking face 16, when the locking catch 14 is in its locking position, extends into the region of the recess 10 and can make contact with the outer face 17 of the ball 12 at the contact point 15. A first connecting line 18 extends through the centre 13 of the recess 10 and the contact point 15 of the locking face 16. The locking catch 14 is arranged to be pivotal about a bearing pin 19. The bearing pin 19 has an axis 20 which is arranged on an extension of the first connecting line 18. In an alternative construction, however, the axis 20 may be offset from the connecting line 18. The bearing pin 19 is supported by two side walls of the housing portion 8. The bearing pin 19 passes through an oblong hole 21 in the locking catch 14, the longitudinal axis of the hole 21 being on an extension of the first connecting line 18. In an alternative construction, however, the longitudinal axis of the hole 21 may extend parallel to the connecting line 18. The longitudinal extension of the oblong hole 21 exceeds the diameter of the bearing pin 19 so that clearance and play 22 is provided. Thus, the bearing pin 19 supports the locking catch 14 with play in the direction of the first connecting line 18.

The coupling hook 5 also comprises a locking stop 23 for the catch 14 supported by the housing portion 8 and having its axis 24 arranged so that the first connecting line 18 and a second connecting line from said axis 24 to the contact point 15 enclose an angle A which is substantially 180 degrees. The angle A is measured outwardly away from the recess i.e. anti-clockwise from the line 18. With the angle A at substantially 180 degrees, the axis 24 is on an extension of the first connecting line 18. However, in alternative constructions, the axis 24 may be positioned so that the angle A is between 140 degrees and 200 degrees. The locking stop 23 is also supported by two side walls of the housing portion 8.

The locking stop 23 engages the locking catch 14 in a recess 25 thereof. This recess 25 is adapted to the outer diameter of the locking stop 23. The recess 25 of the locking catch 14 has an undercut 28 from its entrance 26 (see FIG. 2). The size of the undercut 28 is less than or equal to the size of the clearance and play 22 with which the bearing pin 19 supports the locking catch 14. This undercut 28 ensures that the locking catch 14 is held in contact with the locking stop 23 if, by means of the outer face 17 of the bearing ball 12, a force is applied in the direction of the connecting line 18 so that the locking catch 14 experiences a moment applied at the contact point 15. The clearance and play 22 allows the locking catch 14 to move in the direction of the first connecting line 18 so that the force is taken on the stop 23. The clearance and play 22 also permits the locking catch 14 to move past the undercut 28 when moving into its locking position.

As aforementioned, the locking catch 14 is loaded by a spring 30 in the direction of its locking position. The coupling hook 5 also comprises a tie rod 29 which is pivotally fixed to the locking catch 14 eccentrically relative to the bearing pin 19 thereof. The tie rod 29 is received between two fork arms of the locking catch 14 which supports a pivot pin 33 of the tie rod 29. The tie rod 29 projects out of the housing portion 8 through an aperture 34. The spring 30 which loads the locking catch into its locking position is arranged concentrically on the tie rod 29 and acts between the locking catch 14 and an inner face 31 of the housing portion 8 surrounding the aperture 34. The end of the tie rod 29 which emerges from the housing portion 8 is equipped with an eye 40 to which may be attached tie means (not shown) to operate the locking catch.

Figure 4:
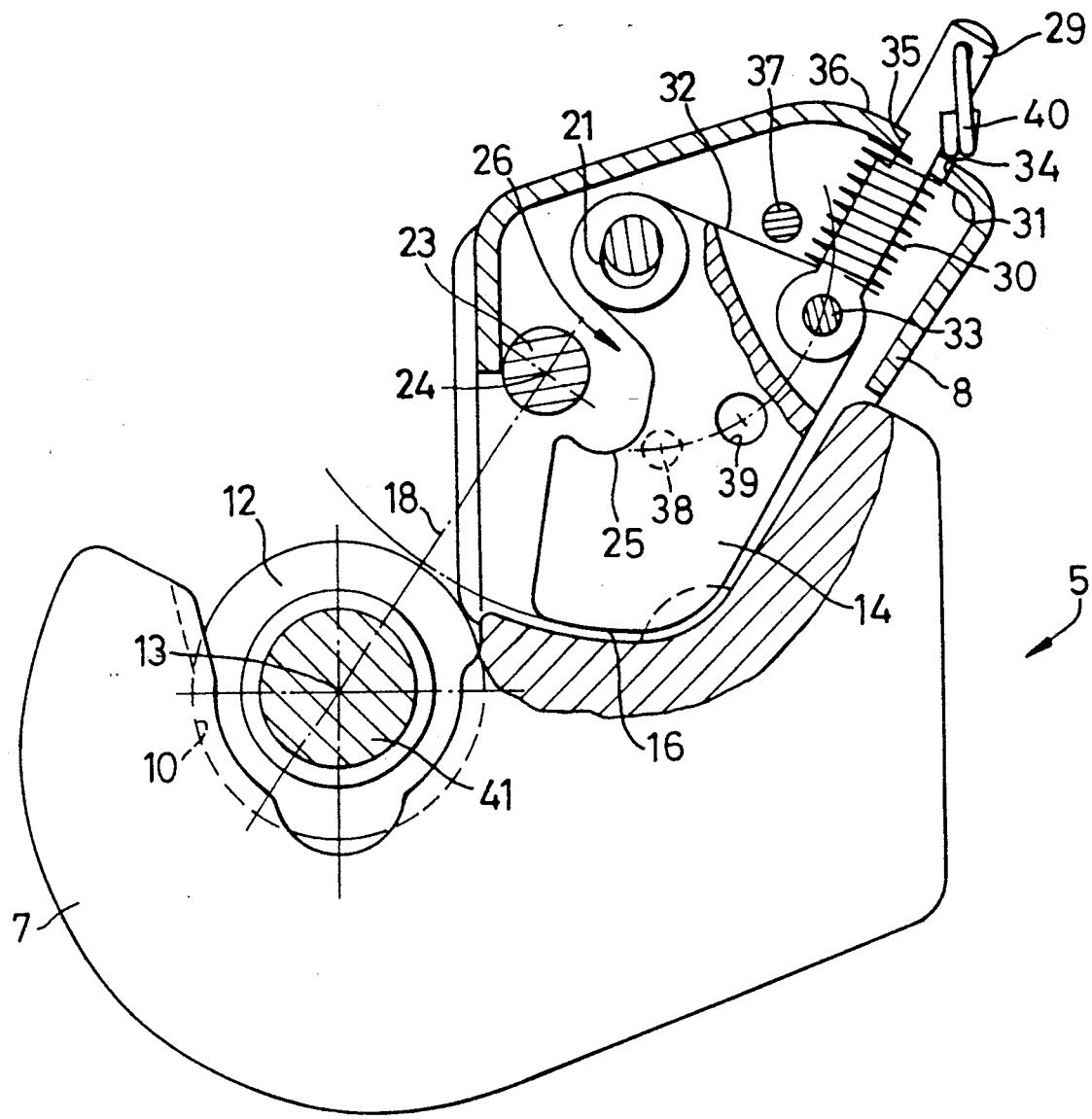
FIG. 4 shows the coupling hook according to FIGS. 2 and 3 but with the locking catch in its unlocking position.

The tie rod 29 further comprises a recess 35 which may be engaged with a stop face 36 of the housing portion 8 which surrounds the aperture 34 (see FIG. 4) to hold the locking catch 14 in the unlocking position thereof. In this position, the locking catch 14 has a face 32 to abut on a stop 37 to provide a limiting stop arranged to limit the movement of the locking catch 14 in the direction of its unlocking position. The stop 37 is also supported by the housing portion 8. The eye 40 may also be used to brace the tie rod against the housing portion 8 (as shown in FIG. 4) to assist in retaining the locking catch 14 in its unlocking position. To move the locking catch from its locking position to its unlocking position, the tie rod 29 is pulled so that the locking catch 14 pivots about the pin 19. The clearance and play 22 allows the undercut 28 to pass the locking stop 23. Alternatively, the locking catch may be transferred into its unlocking position by presenting an implement pin or a ball to the recess 10 so that the pin or ball engages a stop face 27 of the locking catch 14 so that the catch is urged into its unlocking position. When the catch 14 is in its unlocking position, the tie rod 29 is pivoted to bring its recess 35 into engagement with the stop face 36 of the housing portion 8.

In order to release the locking catch 14 from its unlocking position, the eye 40 is used to pivot the tie rod 29 until the stop face 36 leaves the recess 35 and the spring 30 can pivot the locking catch 14 into its locking position. If the implement is to be used in an area in which branches may enter the coupling hook 5, for example in the forest, a safety plug may be provided for the locking catch 14 which can be inserted through bores 38 in the side walls of the housing portion 8 and through a bore 39 in the locking catch 14. This plug which is not shown in the drawings locks the locking catch in its locking position.

I claim:

1. A coupling hook suitable for use on a lower steering arm of a three-point attaching device of a tractor for receiving and locking an implement pin or a bearing ball mounted on an implement pin, the coupling hook, comprising:
   a housing defining a recess in which a pin or ball may be received;
   a spring-loaded locking catch movable into a locking position in which the catch has a contact point with the pin or ball in the housing recess to retain it in the housing recess, the locking catch having an oblong hole and being pivotal about a bearing pin supported by the housing into an unlocking position against the force of a spring; and
   a locking stop for the locking catch, supported by the housing and defining the locking position of the locking catch by engagement with the locking catch, the bearing pin supporting the locking catch through the oblong hole with clearance and play along or parallel to a line from said contact point to a center point of the housing recess defined by the housing, the locking stop engaging the catch in a recess of the catch, the recess of the catch having an entrance and an undercut extending inwardly of the entrance, the undercut having a size no greater than that of the clearance and play with which the bearing pin supports the catch.

2. A coupling hook according to claim 1, wherein the locking stop has an axis arranged so that the first line from said contact point to the center point of the recess defined by the housing and a second line from said locking stop axis to said contact point enclose an angle of between 140 degrees and 200 degrees measured outwardly away from the recess.

3. A coupling hook according to claim 2, wherein said angle is substantially 180 degrees.

4. A coupling hook according to claim 2, wherein said angle is between 140 degrees nd 180 degrees.

5. A coupling hook according to claim 2, wherein said angle is between 180 degrees and 200 degrees.

6. A coupling hook according to claim 1, wherein the bearing pin has an axis arranged on an extension of the line from said contact point to the center point of the recess defined by the housing.

7. A coupling hook according to claim 1, wherein the oblong hole in the locking catch has a longitudinal axis which when the catch is in the locking position, extending in the direction of the first line from said contact point to the center point of the recess defined by the housing or parallel thereto.

8. A coupling hook according to claim 1, wherein the locking stop is in the form of a pin whose center is on an extension of the line from said contact point to the center of the recess.

9. A coupling hook according to claim 1, wherein the coupling hook also comprises a tie rod pivotally fixed to the locking catch eccentrically relative to the bearing pin of the locking catch, the tie rod projecting out of the housing, and the spring which loads the locking catch into its locking position being arranged concentrically of the tie rod and being compressed between the locking catch and an inner face of the housing.

10. A coupling hook according to claim 1, wherein the tie rod is received between two fork arms of the locking catch which support a pivot pin of the tie rod.

11. A coupling hook according to claim 1, wherein the tie rod defines a locking recess which is engageable with a stop face of the housing so as to hold the locking catch in the unlocking position thereof.

12. A coupling hook according to claim 1, wherein a portion of the housing which accommodates the locking catch is made of sheet metal or cast steel non-removably attached to a portion of the housing which defines the recess.

13. A coupling hook according to claim 1, wherein the coupling hook has a limiting stop arranged so as to limit movement of the locking catch toward the unlocking position.

* * * * *